C. E. WILLIAMS.
LUBRICANT FILLING DEVICE.
APPLICATION FILED NOV. 3, 1908.
934,254.
Patented Sept. 14, 1909.
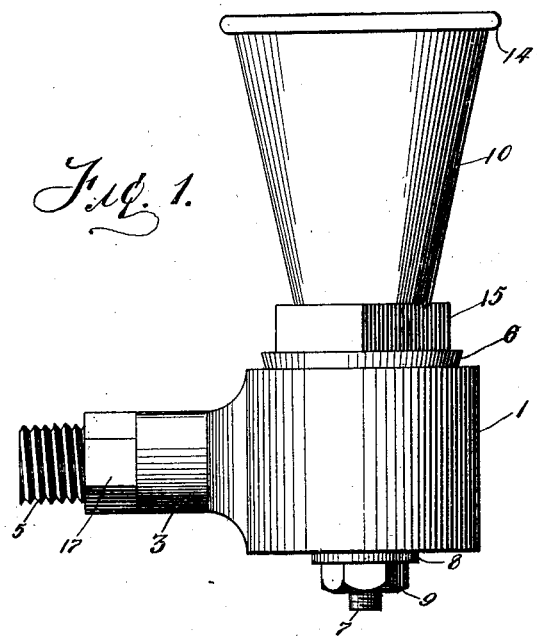
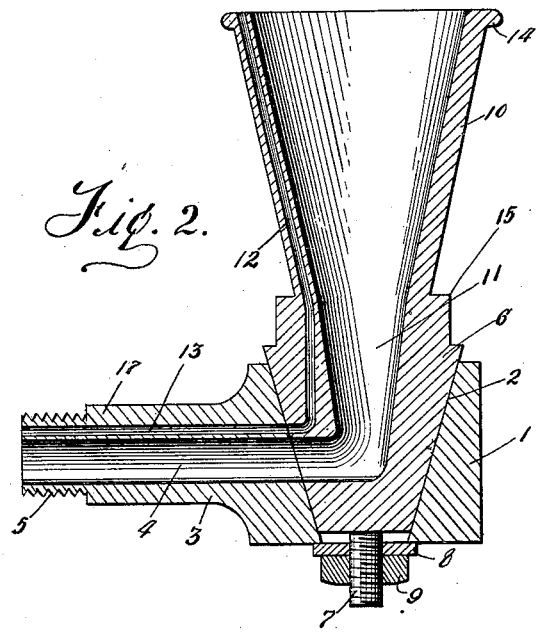
Witnesses
R. L. Farrington.
N. H. Butler
Inventor
C. E. Williams.
By H. C. Everett
Attorneys

UNITED STATES PATENT OFFICE.

CLYDE E. WILLIAMS, OF KENNERDELL, PENNSYLVANIA.

LUBRICANT-FILLING DEVICE.

934,254.　　　　　Specification of Letters Patent.　　Patented Sept. 14, 1909.

Application filed November 3, 1908.　Serial No. 460,891.

*To all whom it may concern:*

Be it known that I, CLYDE E. WILLIAMS, a citizen of the United States of America, residing at Kennerdell, in the county of Venango and State of Pennsylvania, have invented certain new and useful Improvements in Lubricant-Filling Devices, of which the following is a specification, reference being had therein to the accompanying drawing.

This invention relates to a lubricant filling device applicable to compressor valves, engine cylinders and oil cups, as a means for quickly lubricating a cylinder or mechanism adapted to contain steam or air under pressure.

The primary object of my invention is to provide a lubricant filling device that normally communicates with the cylinder or mechanism to be lubricated, the device being easily opened and closed when the same is used.

A further object of my invention is to provide a simple and inexpensive funnel attachment for cylinders and mechanism to be lubricated, the funnel attachment serving functionally as a valve where communication with the cylinder or mechanism is to be shut off.

A still further object of my invention is the provision of means in connection with the lubricant filling device whereby air can escape from the cylinder when admitting lubricant thereto.

With the above and other objects in view which will more readily appear as the invention is better understood, the same consists in the novel construction, combination and arrangement of parts to be hereinafter described and then specifically claimed.

Referring to the drawings:—Figure 1 is a side elevation of the lubricant filling device, and Fig. 2 is a vertical longitudinal sectional view of the same.

In the accompanying drawings, 1 designates a cylindrical body having a tapering vertical bore 2 and a radial stem 3 the latter provided with a longitudinal bore 4 communicating with the bore 2 of the body 1. The stem 3 is provided with an exteriorly threaded reduced end 5, whereby the stem can be secured to a cylinder or similar mechanism to communicate therewith.

Revolubly mounted in the bore 2 of the cylinder body 1 is a tapering plug 6, said plug having a depending threaded stem 7 for a washer 8 and a nut 9, said washer and nut being used to retain the plug within the bore 2 of the cylindrical body 1. The upper end of the plug 6 is formed with a funnel 10 communicating with a tapering angular passage 11 formed in the plug 6, said passage being adapted to register with the bore 4 of the stem 3. The funnel 10 and the plug 6 are formed with an air port 12 adapted to communicate with a longitudinal air port 13 formed in the stem 3.

As shown in Fig. 2 of the drawings, a lubricant can be poured in the funnel 10 and passed direct through the bore 4 to the cylinder or mechanism to be lubricated, the air escaping from the cylinder through the ports 13 and 12. After the cylinder has been lubricated, the funnel 10 can be gripped and turned a quarter of a revolution in either direction to close the inner end of the bore 4 and the port 13, whereby pressure of air or steam in the cylinder can not escape through said bore and said port. To facilitate the movement of the funnel 10, the upper edge thereof is provided with a peripheral flange 14 forming a grip for the hand when rotating the funnel. To permit of a wrench or similar instrument being used, the funnel 10 adjacent to the plug 6 is provided with a rectangular enlargement 15. In order that the stem 3 can be secured in the cylinder, said stem is provided with flat faces 17 allowing a wrench to be used for rotating the same.

The lubricant filling device is made of strong and durable metal and is adapted to facilitate the operation of lubricating inclosures, wherein steam, air or gas is under pressure.

While in the drawings forming a part of this application there is illustrated a preferred embodiment of my invention, it is obvious that the same can be varied or changed without departing from the spirit of the invention.

Having now described my invention what I claim as new, is:—

1. A lubricant filling device comprising a cylindrical body having a tapering bore formed therein, a stem carried by said body and having a longitudinal bore formed therein communicating with the bore of said body, a plug revolubly mounted in the bore of said body and having an angular passage formed therein adapted to register with the bore of said stem, a funnel carried by said plug and communicating with said passage, said funnel having an air port formed therein, said stem having a longitudinal air port formed therein adapted to register with the port of said funnel, and means for facilitating the rotation of said plug to cut off the communication between the passage of said plug and the bore of said stem and said air ports, substantially as described.

2. A lubricant filling device comprising a cylindrical body, a stem carried thereby and having a longitudinal bore formed therein, a plug revolubly mounted in said body and having a passage adapted to communicate with said bore, a funnel carried by said plug, said funnel having an air port formed therein, and said stem having an air port formed therein adapted to communicate with the air port of said funnel.

In testimony whereof I affix my signature in the presence of two witnesses.

CLYDE E. WILLIAMS.

Witnesses:
C. P. WHITMAN,
WM. B. GRIFFEN.